United States Patent
Ho

(10) Patent No.: US 12,487,412 B2
(45) Date of Patent: Dec. 2, 2025

(54) FIBER OPTIC CONNECTOR WITH DISPLACEABLE GUIDE PIN

(71) Applicant: SENKO Advanced Components, Inc., Hudson, MA (US)

(72) Inventor: Man Ming Ho, Kowloon (HK)

(73) Assignee: Senko Advanced Components, Inc., Hudson, MA (US)

( * ) Notice: Subject to any disclaimer, the term of this patent is extended or adjusted under 35 U.S.C. 154(b) by 532 days.

(21) Appl. No.: 18/048,717

(22) Filed: Oct. 21, 2022

(65) Prior Publication Data

US 2023/0128562 A1 Apr. 27, 2023

Related U.S. Application Data

(60) Provisional application No. 63/270,734, filed on Oct. 22, 2021.

(51) Int. Cl.
*G02B 6/38* (2006.01)

(52) U.S. Cl.
CPC ......... *G02B 6/3882* (2013.01); *G02B 6/3821* (2013.01); *G02B 6/3885* (2013.01)

(58) Field of Classification Search
CPC ... G02B 6/3821; G02B 6/3882; G02B 6/3885
See application file for complete search history.

(56) References Cited

U.S. PATENT DOCUMENTS

| | | | | |
|---|---|---|---|---|
| 8,858,091 | B2* | 10/2014 | Koreeda | G02B 6/383 385/56 |
| 11,543,601 | B1* | 1/2023 | Xiao | G02B 6/3893 |
| 2019/0377138 | A1* | 12/2019 | Wong | G02B 6/3885 |
| 2022/0091346 | A1* | 3/2022 | Morita | G02B 6/3861 |

FOREIGN PATENT DOCUMENTS

WO WO-2021065195 A1 * 4/2021 ........... G02B 6/3821

OTHER PUBLICATIONS

Translation of WO-2021065195-A1. (Year: 2021).*

* cited by examiner

*Primary Examiner* — Ryan A Lepisto

(57) ABSTRACT

In a fiber optic connector, a ferrule body is received in a connector housing. A displaceable guide pin is movable in relation to the ferrule body. A spring yieldably biases the displaceable guide pin forward along a longitudinal axis of the fiber optic connector. The displaceable guide pin is displaced backward along the longitudinal axis in relation to the ferrule body and resiliently compresses the spring as the fiber optic connector is connected to another fiber optic component. In a multifiber ferrule assembly, a ferrule base is connected to a ferrule body. A displaceable guide pin is movably connected to the ferrule body for movement in relation to the ferrule body along a longitudinal axis between an extended position and a retracted position. A spring between the displaceable guide pin and the ferrule base yieldably biases the displaceable guide pin to the extended position.

17 Claims, 13 Drawing Sheets

FIBER OPTIC CONNECTOR WITH DISPLACEABLE GUIDE PIN

CROSS-REFERENCE TO RELATED APPLICATION

This application claims priority to U.S. Provisional Patent Application No. 63/270,734, which is hereby incorporated by reference in its entirety.

FIELD

This disclosure generally pertains to a fiber optic connector, and more particularly, to fiber optic connector with a displaceable guide pin.

BACKGROUND

The prevalence of the Internet has led to unprecedented growth in communication networks. Consumer demand for service and increased competition has driven network providers to continuously search for ways to improve quality of service while reducing cost. Optical communications systems are preferred for some applications because of their bandwidth and reliability.

SUMMARY

In one aspect, a fiber optic connector comprises a connector housing. A ferrule body is received in the connector housing. A displaceable guide pin is configured for aligning the ferrule body with another fiber optic component when the fiber optic connector is connected to the other fiber optic component. A spring is configured to yieldably bias the displaceable guide pin forward along a longitudinal axis of the fiber optic connector. The fiber optic connector is configured so that the displaceable guide pin is displaced backward along the longitudinal axis in relation to the ferrule body and resiliently compresses the spring as the fiber optic connector is connected to the other fiber optic component.

In another aspect, a multifiber ferrule assembly comprises a multifiber ferrule body. A ferrule base is connected to the multifiber ferrule body. A displaceable guide pin is movably connected to the multifiber ferrule body for movement in relation to the multifiber ferrule body along a longitudinal axis of the multifiber ferrule assembly between an extended position and a retracted position. A spring between the displaceable guide pin and the ferrule base yieldably biases the displaceable guide pin to the extended position.

Other aspects will be in part apparent and in part pointed out hereinafter.

BRIEF DESCRIPTION OF THE DRAWINGS

Corresponding parts are given corresponding reference characters throughout the drawings.

DETAILED DESCRIPTION

Figure 1:
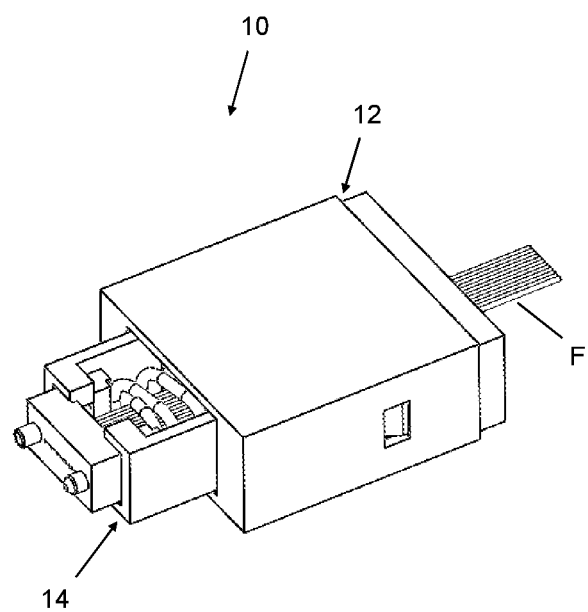
FIG. 1 is a perspective of a fiber optic connector of the present disclosure.
Figure 2:
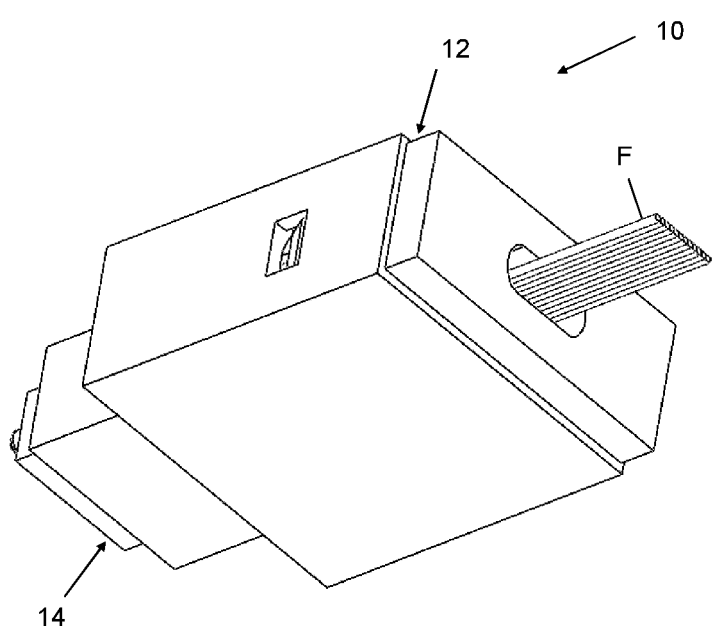
FIG. 2 is another perspective of the fiber optic connector.
Figure 3:
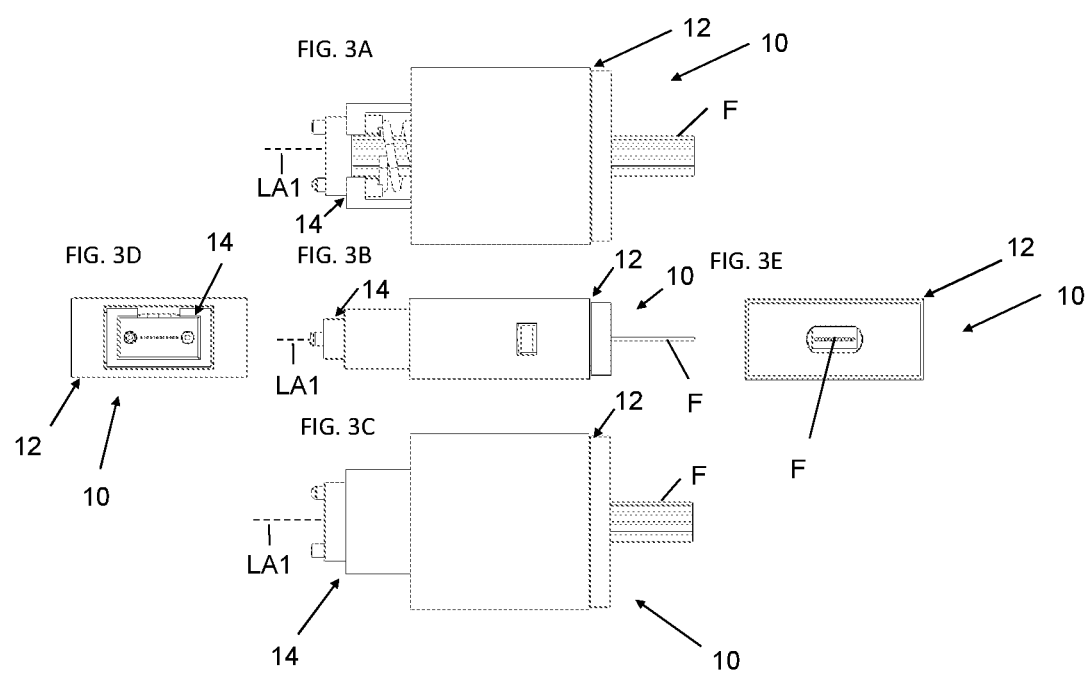
FIG. 3A is a top plan view of the fiber optic connector.
FIG. 3B is a side elevation of the fiber optic connector.
FIG. 3C is a bottom plan view of the fiber optic connector.
FIG. 3D is a front elevation of the fiber optic connector.
FIG. 3E is a rear elevation of the fiber optic connector.

Referring to FIGS. 1-6, an exemplary embodiment of a fiber optic connector in the scope of the present disclosure is generally indicated at reference number 10. The connector 10 comprises a connector housing assembly 12, a multifiber ferrule assembly 14 received in the connector housing assembly, and a pair of ferrule springs 16 configured yieldably bias the multifiber ferrule assembly forward along a longitudinal axis LA1 in relation to the connector housing assembly.

Figure 5:
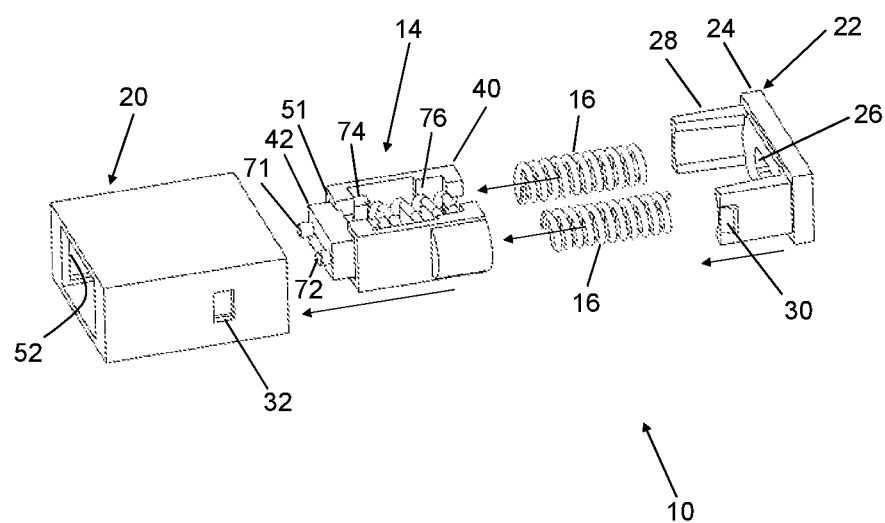
FIG. 5 is another exploded perspective of the fiber optic connector.

As shown in FIG. 5, the connector housing assembly 12 comprises a front body 20 (broadly, a connector housing or plug frame) and a back body 22. The back body 22 includes a back wall 24 that defines a fiber opening 26 through which a plurality of fibers F are passable to be received in the multifiber ferrule assembly 14. The back wall 24 defines a forward facing spring seat 27 on opposite sides of the fiber opening 26 for engaging back ends of the ferrule springs 16. Latch arms 28 are positioned at the same side of the seat 27 and extend forward from the back wall 24. Each latch arm includes latch hooks 30 near their front ends. The illustrated front body 20 comprises a generally rectangular wall that extends 360 degrees around the longitudinal axis LA1. That is, the front body 20 encloses a space to receive the ferrule assembly 14. The front body 20 has latch recesses 32 on opposite side walls configured to latch with the latch hooks 30 of the back body 22 to fasten the front body and back body together.

Those skilled in the art will recognize that the multifiber ferrule assembly 14 is substantially different than a conventional multifiber ferrule. Conventional multifiber ferrules include a ferrule body defining one or more rows of fiber passages in which the ferrule is configured to terminate a plurality of optical fibers and first and second guide pin openings on opposite sides of the ferrule row(s). Conventional multifiber ferrules can have one of three configurations. The first possible configuration is a female configuration in which the guide pin openings are both open. The second configuration is a hermaphroditic configuration in which one guide pin opening is open and the ferrule mounts a guide pin in the other opening at a fixed position so that the guide pin extends forward from the front end of the ferrule body. The third option is a male configuration in which the ferrule mounts guide pins in both guide pin openings at fixed positions to extend forward from the front end of the ferrule body. When a male multifiber ferrule is mated with a female multifiber ferrule, the two guide pins of the male ferrule are received in the guide pin openings of the female ferrule. When two hermaphroditic ferrules are mated together, each guide pin is received in the open guide pin opening of the other ferrule. As explained in further detail below, the illustrated ferrule assembly 14 provides for displaceable guide pins.

Figure 4:
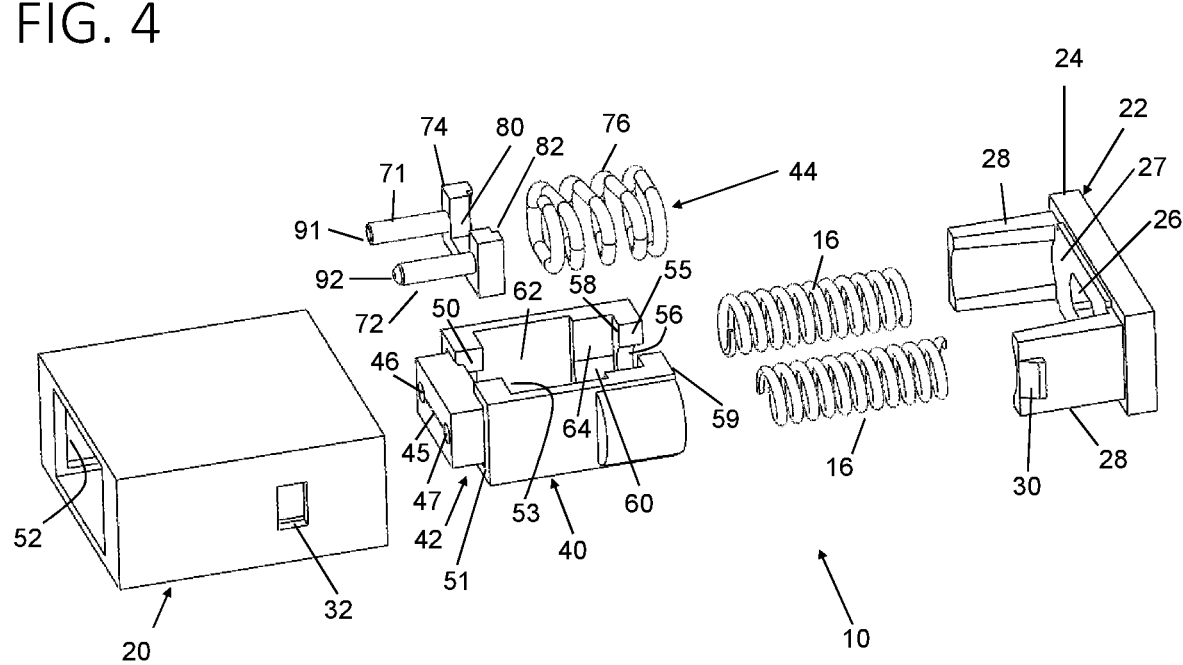
FIG. 4 is an exploded perspective of the fiber optic connector.
Figure 6:
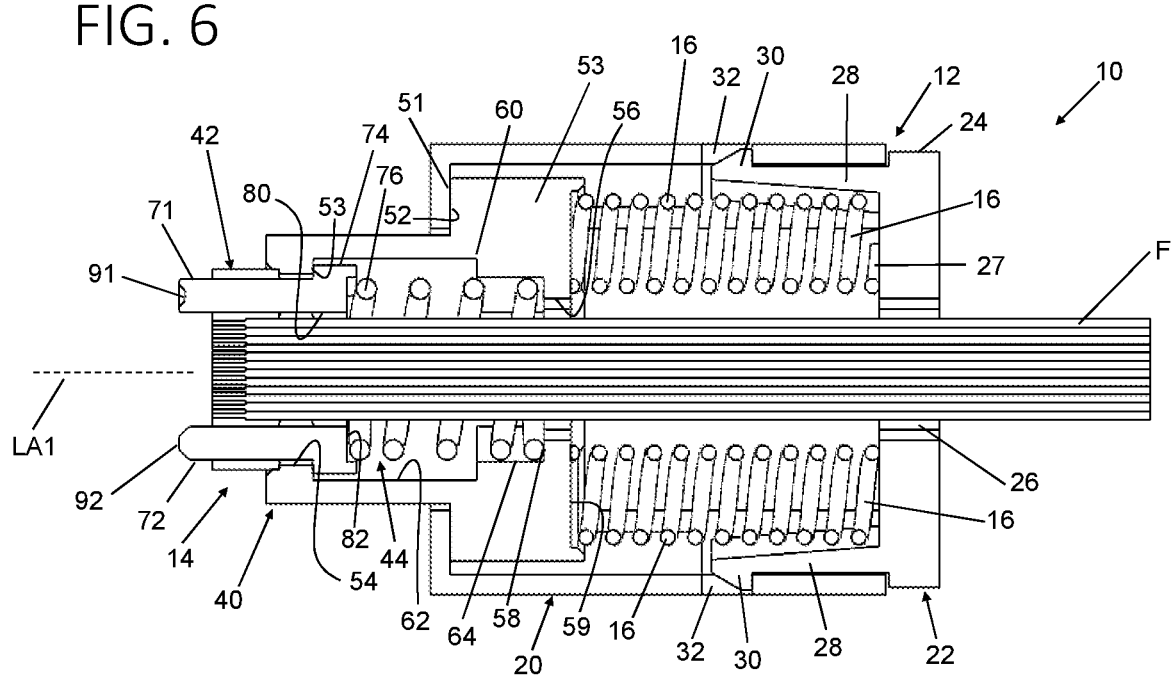
FIG. 6 is a cross section of the fiber optic connector.

Referring to FIGS. 4-6, the illustrated ferrule assembly 14 comprises a ferrule base 40, a ferrule body 42, and a spring loaded guide pin assembly 44. As with the ferrule bodies used in conventional multifiber ferrules, the ferrule body 42 defines one or more rows of optical fiber passages 45 in which to terminate a plurality of optical fibers and has first and second guide pin openings 46, 47 (FIG. 4) on opposite sides of the fiber passages. As explained in further detail below, the spring loaded guide pin assembly 44 is broadly configured to mount a displaceable guide pin in at least one of the guide pin openings 46, 47 for movement in relation to the ferrule body 42 along the longitudinal axis LA1.

The ferrule base 40 has a front end portion and back end portion spaced apart along the longitudinal axis LA1. The front end portion of the ferrule base 40 comprises a front wall 50 on which the multifiber ferrule body 42 is mounted. The front wall 50 defines a forward facing ferrule flange 51 configured to engage a backward facing internal shoulder 52 of the front body 20 to prevent the ferrule springs 16 from ejecting the ferrule assembly 14 forward out of the connector housing assembly 12. The front wall 50 also defines a backward facing shoulder 53 that is configured to support the spring loaded guide pin assembly 44 as described in further detail below. The front wall 50 defines a central opening 54 (FIG. 6) through which the optical fibers F pass.

The back end portion of the ferrule base 40 comprises a back wall 55 defining a central opening 56 through which fibers F pass. Around the central opening 56, the back wall 55 defines a forward facing spring seat 58 configured to brace the back end portion of the spring loaded guide pin assembly 44 and a backward facing spring seat 59 configured to engage the front ends of the ferrule springs 16. Accordingly, it can be seen that the ferrule springs 16 can be compressed between the backward facing spring seat 59 of the ferrule assembly 14 and the forward facing spring seat 27 of the housing assembly 12 to allow for backward displacement of the ferrule assembly within the connector housing assembly.

Between the front wall 50 and the back wall 55, the ferrule base 40 defines a receiver 60 for the spring loaded guide pin assembly 44. The receiver 60 includes a guide 62 adjacent the front wall 50 and a cradle 64 adjacent the back wall 55. The functions of the guide 62 and cradle 64 will be described in further detail below.

The illustrated spring loaded guide pin assembly 44 generally comprises a first guide pin 71 for being movably received in the first guide pin opening 46, a second guide pin 72 for being movably received in the second guide pin opening 47, a guide pin holder 74 for being movably received in the guide 62 of the receiver 60, and a guide pin spring 76 for being received between the guide pin holder 74 and the forward facing spring seat 58. The first and second guide pins 71, 72 are connected to the guide pin holder 74 such that the guide pin holder 74 and the guide pins 71, 72 move together in relation to the ferrule body 42 and ferrule base 40. In the illustrated embodiment, the guide pin holder 74 is generally U-shaped, comprising a first side portion mounting the first guide pin 71, a second side portion mounting the second guide pin 72, and a lower portion connecting the first and second side portions. The holder 74 defines an opening 80 through which the optical fibers F are passable to the ferrule body 42. The guide pin holder 74 is sized and shaped to be movably received in the guide 62 of the ferrule base 40. Hence, the guide 62 functions as a holder guide for receiving the guide pin holder 74 and guiding the guide pin holder for movement in relation to the ferrule base 40 along the longitudinal axis LA1.

The back side of the guide pin holder 74 defines a spring seat 82 configured to engage the front end of the guide pin spring 76. A back end portion of the guide pin spring 76 is received in the cradle 64 of the ferrule base 40, whereby the ferrule base retains and stabilizes the guide pin spring. The back end of the guide pin spring 76 engages the forward facing spring seat 58 of the ferrule base 42. Thus, the guide pin spring 76 is captured between the guide pin holder 74 and the forward facing spring seat 58 so that the guide pin spring 76 biases the guide pin holder 74 forward along the longitudinal axis LA1 to a front, extended position at which the guide pin holder 74 presses against the backward facing shoulder 52 of the ferrule base 40. The illustrated guide pin spring 76 is a coil spring sized and shaped so that the optical fibers F are passable through the interior of the coil to the ferrule body 42. During use, when the guide pins 71, 72 are pressed backward along the longitudinal axis LA1, the guide pins 71, 72 and holder 74 move backward together in relation to the ferrule body 42 and ferrule base 40, thereby compressing the guide pin spring 76 and causing the compressed guide pin spring 76 to urge the holder and guide pins forward.

In the illustrated embodiment, the guide pins 71, 72 have a hermaphroditic tip configuration so that two identical connectors 10 can be mated together. The first displaceable guide pin 71 has a concave tip portion 91, and the second displaceable guide pin 72 has a convex tip portion 92. During use, when two identical connectors 10 are connected together, the convex tip portion 92 of each connector 10 is configured to be matingly received in the concave tip portion 91 of the other connector. Although the illustrated connector 10 has a hermaphroditic tip configuration, it will be understood that connectors with male (all convex tip portions) and female (all concave tip portions) can also be used without departing from the scope of the disclosure.

Figure 7A:
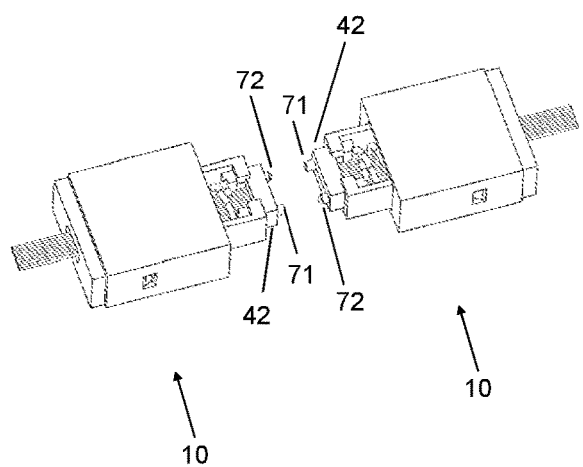
FIG. 7A is a perspective of two fiber optic connectors of FIG. 1 approaching one another.
Figure 7B:
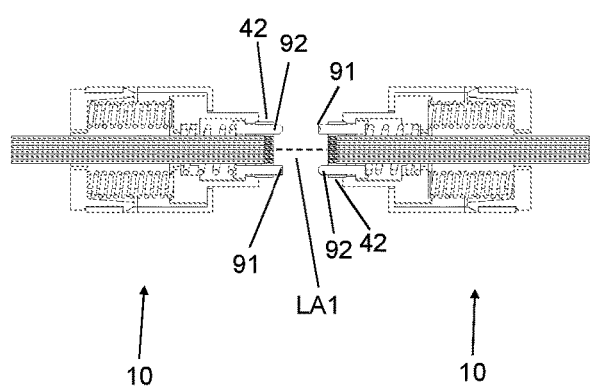
FIG. 7B is a cross section of FIG. 7A.
Figure 8A:
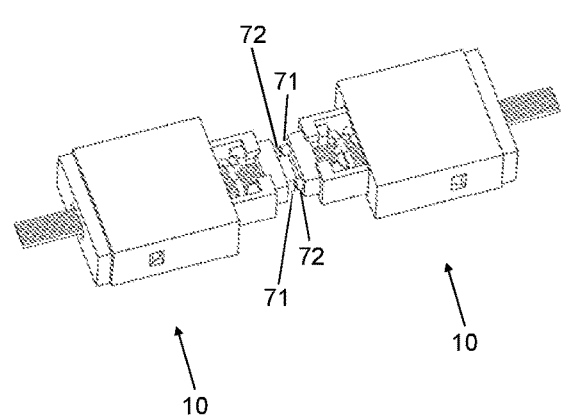
FIG. 8A is a perspective similar to FIG. 7A, but showing the fiber optic connectors moved so that displaceable guide pins thereof contact one another without displacement.
Figure 8B:
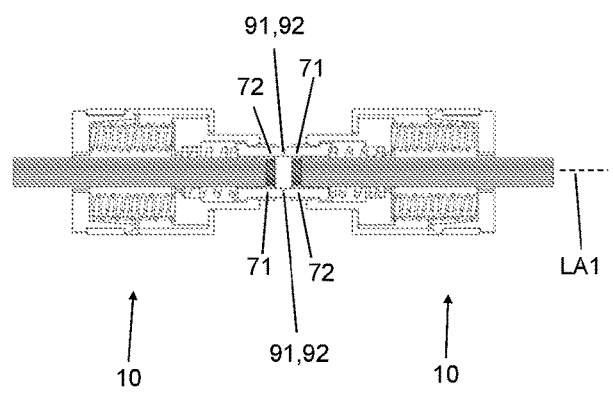
FIG. 8B is a cross section of FIG. 8A.
Figure 9A:
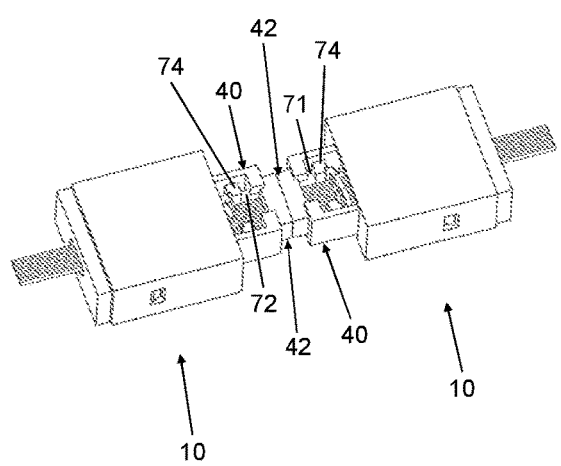
FIG. 9A is a perspective similar to FIG. 8A, but showing the fiber optic connectors moved so that the displaceable guide pins are displaced until ferrule bodies of the connectors are in face to face contact without displacement in relation to housings of the connectors.
Figure 9B:
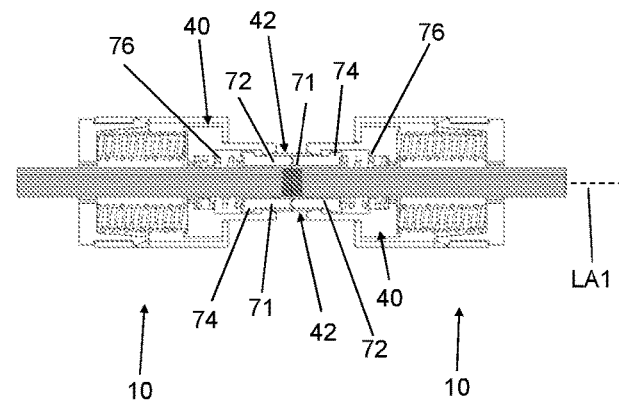
FIG. 9B is a cross section of FIG. 9A.
Figure 10A:
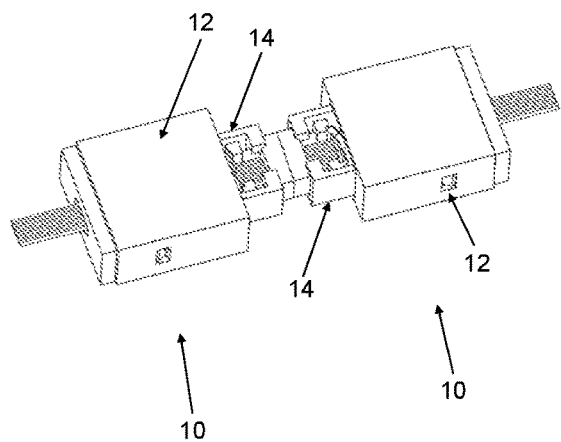
FIG. 10A is a perspective similar to FIG. 9A, but showing the fiber optic connectors moved so that the ferrule bodies are displaced in relation to the housings of the connectors.
Figure 10B:
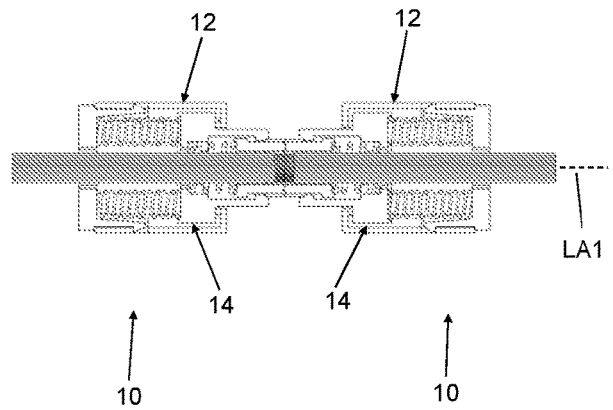
FIG. 10B is a cross section of FIG. 10A.

Referring to FIGS. 7A-10B, an exemplary method of mating two fiber optic connectors 10 will now be described. In FIGS. 7A-10B, only the two connectors 10 are shown for clarity, but it will be understood that an adapter could be used in a connection system with the two connectors to facilitate and maintain a connection between the connectors. Initially, as shown in FIGS. 7A-7B, the two connectors 10 are aligned so that the longitudinal axes LA1 are coaxial and the ferrule bodies 42 face one another. The connectors 10 are oriented so that the first guide pin 71 of each connector 10 opposes the second guide pin 72 of the opposing connector, e.g., so that each convex tip portion 91 is configured to mate with an opposing concave tip portion 92. As shown in FIGS. 8A-8B, the connectors 10 are then moved together along the longitudinal axis LA1 so that each convex tip portion 91 matingly engages the opposing concave tip portion 92. The mated engagement of the tip portions 91, 92 helps maintain proper alignment of the two connectors during the rest of the connection procedure. Next, as shown in FIGS. 9A-9B, the connectors 10 are moved further toward one another along the longitudinal axis LA1. This causes the displaceable guide pins 71, 72 and guide pin holder 74 of each connector to move from respective front, extended positions backward along the longitudinal axis A with respect to the respective ferrule body 42 and ferrule base 40 to respective back, retracted positions at which the front faces of the ferrule bodies engage one another. The guide pin springs 76 become compressed so that they resiliently urge the holders 74 forward along the longitudinal axis LA1. As shown in FIGS. 10A-10B, the connectors 10 can be moved still further toward one another along the longitudinal axis LA1, which displaces each ferrule assembly 14 rearward as a unit in relation to the respective housing assembly 12. This loads the ferrule assemblies 14 so that proper face-to-face contact is maintained.

Accordingly, it can be seen that the inventors have devised an optical fiber connector and multifiber ferrule assembly employing displaceable guide pins. The inventor believes that the proposed connector with displaceable guide pins is advantageous because it allows for mating of the guide pins prior to any contact with the ferrule end face. Prior guide pin systems require the tip of a guide pin to pass through the end face of a ferrule before any mating of the guide pin occurs.

Figure 11:
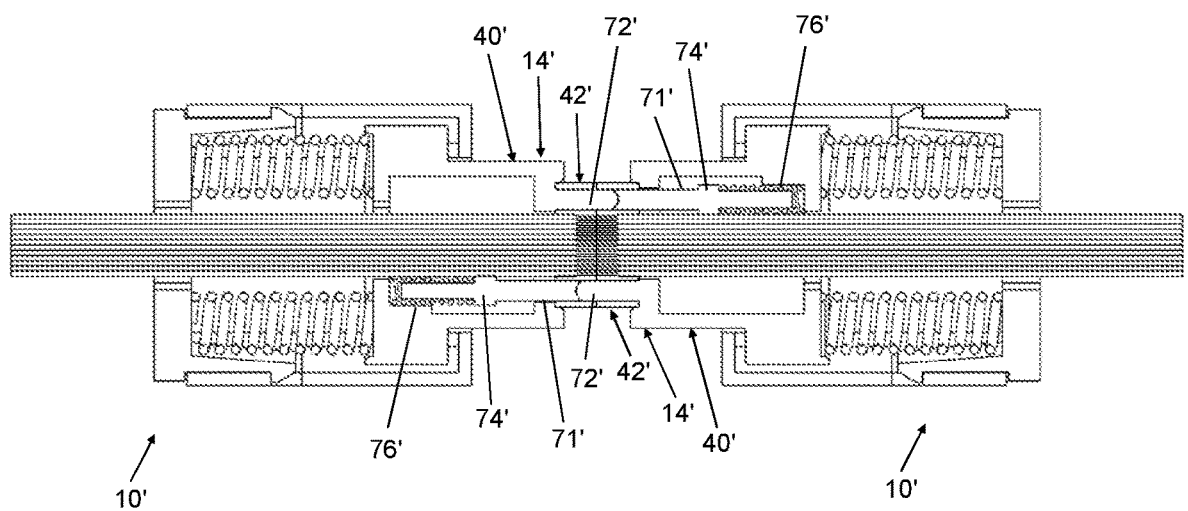
FIG. 11 is a cross section similar to FIG. 10B, but showing another type of fiber optic connector in the scope of the disclosure.

Various alternative embodiments employing one or more displaceable guide pins can be used without departing from the scope of the disclosure. For example, referring to FIG. 11, another exemplary embodiment of a fiber optic connector in the scope of the present disclosure is generally indicated at reference number 10'. Two fiber optic connectors 10' are shown connected in FIG. 11. Each connector 10' is substantially the same as the connector 10, and corresponding parts are given corresponding reference numbers, followed by a prime symbol. The connector 10' differs from the connector 10 in that the multifiber ferrule assembly 14 has one displaceable guide pin 71', instead of two. In the single displaceable guide pin embodiment, the guide pin holder 74' comprises a flange on the displaceable guide pin 71', and a smaller coil spring 76' presses against the flange to yieldably bias the displaceable guide pin forward with respect to the ferrule body 42' and the ferrule base 40'. The second guide pin 72' of the multifiber ferrule assembly 42' is fixed in relation to the ferrule body 42' and the ferrule base 40'. Accordingly, when two connectors 10' are connected to one another, the fixed guide pin 72' of each connector presses the opposing displaceable guide pin 71' backward and is partially received in the ferrule body 42' of the other connector.

Figure 12:
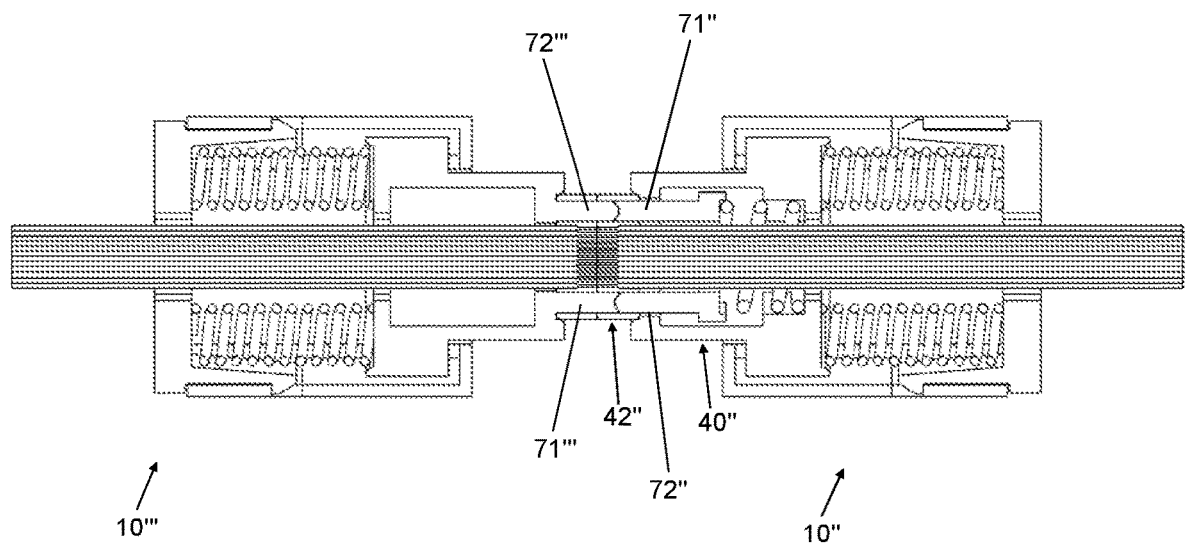
FIG. 12 is a cross section similar to FIGS. 10B and 11, but showing yet another type of fiber optic connector in the scope of the disclosure.

Referring to FIG. 12, in another embodiment, a connection system in the scope of the present disclosure comprises a first connector 10" having two displaceable guide pins 71", 72" and a second connector 10''' having two fixed guide pins 71''', 72'''. When the first connector 10" is connected to the second connector 10''', the fixed guide pins 71', 72''' displace the displaceable guide pins 71", 72" in relation to the respective ferrule body 42" and ferrule base 40" so that portions of the fixed guide pins are received in the guide pin openings of the ferrule body 42".

Figure 13:
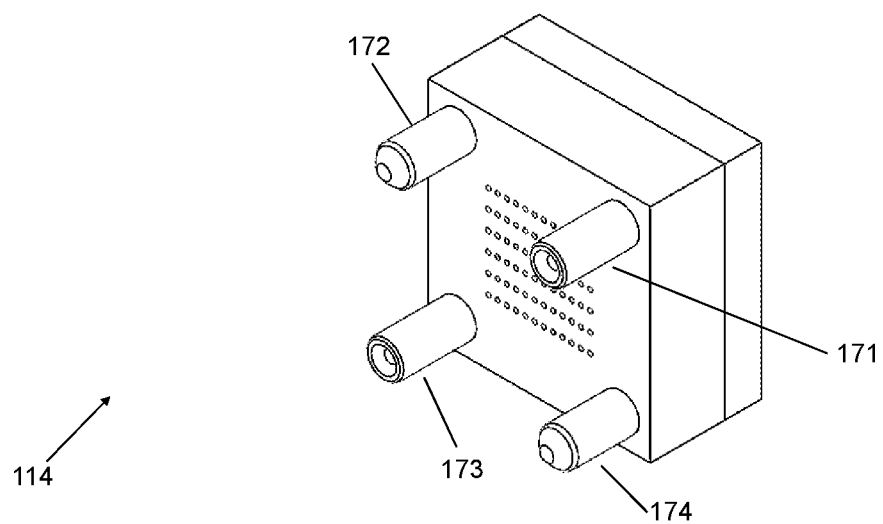
FIG. 13 is a perspective of a multifiber ferrule assembly in the scope of the disclosure.

It will also be appreciated that different numbers of guide pins (displaceable and/or fixed) can be used without departing form the scope of the disclosure. For example, as shown in FIG. 13, another embodiment of a ferrule 114 comprises four displaceable guide pins 171, 172, 173, 174. Still other configurations of ferrule assemblies with displaceable guide pins are possible without departing from the scope of the disclosure.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A fiber optic connector comprising:
a connector housing;
a ferrule body received in the connector housing;
a displaceable guide pin configured for aligning the ferrule body with another fiber optic component when the fiber optic connector is connected to the other fiber optic component; and
a spring configured to yieldably bias the displaceable guide pin forward along a longitudinal axis of the fiber optic connector;
wherein the fiber optic connector comprises a ferrule base received in the connector housing and connected to the ferrule body, and the spring is between the ferrule base and the displaceable guide pin;
wherein the fiber optic connector is configured so that the displaceable guide pin is displaced backward along the longitudinal axis in relation to the ferrule body and resiliently compresses the spring as the fiber optic connector is connected to the other fiber optic component.

2. The fiber optic connector as set forth in claim 1, wherein the displaceable guide pin has one of (i) a concave tip portion configured to mate with a corresponding convex surface of the other fiber optic component and (ii) a convex tip portion configured to mate with a corresponding concave surface of the other fiber optic component.

3. The fiber optic connector as set forth in claim 1, wherein the displaceable guide pin is a first displaceable guide pin, the fiber optic connector further comprising a second displaceable guide pin.

4. The fiber optic connector as set forth in claim 3, further comprising a guide pin holder, the first displaceable guide pin and the second displaceable guide pin being mounted on the guide pin holder for movement with the guide pin holder in relation to the ferrule body and the ferrule base.

5. The fiber optic connector as set forth in claim 4, wherein the spring is between the ferrule base and the guide pin holder.

6. The fiber optic connector as set forth in claim 5, wherein ferrule base defines a holder guide for receiving the guide pin holder and guiding the guide pin holder for movement in relation to the ferrule base along the longitudinal axis.

7. The fiber optic connector as set forth in claim 6, wherein the guide pin holder defines a rearward facing spring seat and the ferrule base defines a forward facing spring seat, the guide pin spring having a front end portion engaged with the rearward facing spring seat and a rear end portion engaged with the forward facing spring seat.

8. The fiber optic connector as set forth in claim 3, wherein the ferrule body defines a row of fiber passages and first and second guide pin openings on opposite sides of the row of fiber passages, the first displaceable guide pin being slidably received in the first guide pin opening and the second displaceable guide pin being slidably received in the second guide pin opening.

9. The fiber optic connector as set forth in claim 8, wherein the first displaceable guide pin has a concave tip portion and the second displaceable guide pin has a convex tip portion.

10. The fiber optic connector as set forth in claim 1, further comprising a fixed guide pin fixed in place with respect to the ferrule such that when the displaceable guide pin is displaced backward along the longitudinal axis in relation to the ferrule body, the displaceable guide pin moves in relation to the fixed guide pin.

11. The fiber optic connector as set forth in claim 1, wherein the displaceable guide pin comprises four spaced apart displaceable guide pins.

12. The fiber optic connector as set forth in claim 1, further comprising a back body and a ferrule spring between the ferrule base and the back body for yieldably biasing the ferrule base and the ferrule body forward with respect to the connector housing.

13. A fiber optic connector comprising:
a connector housing;
a ferrule body received in the connector housing;
a displaceable guide pin configured for aligning the ferrule body with another fiber optic component when the fiber optic connector is connected to the other fiber optic component; and
a spring configured to yieldably bias the displaceable guide pin forward along a longitudinal axis of the fiber optic connector;
wherein the fiber optic connector comprises a ferrule base received in the connector housing and connected to the ferrule body, a back body and a ferrule spring between the ferrule base and the back body for yieldably biasing the ferrule base and the ferrule body forward with respect to the connector housing.

14. The fiber optic connector as set forth in claim 13, wherein the displaceable guide pin is a first displaceable guide pin, the fiber optic connector further comprises a second displaceable guide pin.

15. The fiber optic connector as set forth in claim 14, further comprising a guide pin holder, the first displaceable guide pin and the second displaceable guide pin being mounted on the guide pin holder for movement with the guide pin holder in relation to the ferrule body and the ferrule base.

16. A multifiber ferrule assembly comprising:
a multifiber ferrule body;
a ferrule base connected to the multifiber ferrule body;
a displaceable guide pin movably connected to the multifiber ferrule body for movement in relation to the multifiber ferrule body along a longitudinal axis of the multifiber ferrule assembly between an extended position and a retracted position;
a spring between the displaceable guide pin and the ferrule base yieldably biasing the displaceable guide pin to the extended position; and
a second guide pin,
wherein the displaceable guide pin is a first displaceable guide pin and the second guide pin is a second displaceable guide pin;
wherein the fiber optic connector comprises a guide pin holder, the first displaceable guide pin and the second displaceable guide pin being mounted on the guide pin holder for movement with the guide pin holder in relation to the multifiber ferrule body and the ferrule base;
wherein the spring is between the ferrule base and the guide pin holder.

17. The multifiber ferrule assembly of claim 16, wherein the displaceable guide pin has one of a concave tip portion and a convex tip portion and the second guide pin has the other of the concave tip portion and the convex tip portion.

* * * * *